Aug. 18, 1959 S. C. ROCKAFELLOW 2,899,857
METHOD FOR COMPARING THE CONTOUR OF AN ARTICLE WITH A STANDARD
Filed Oct. 3, 1956 2 Sheets-Sheet 1
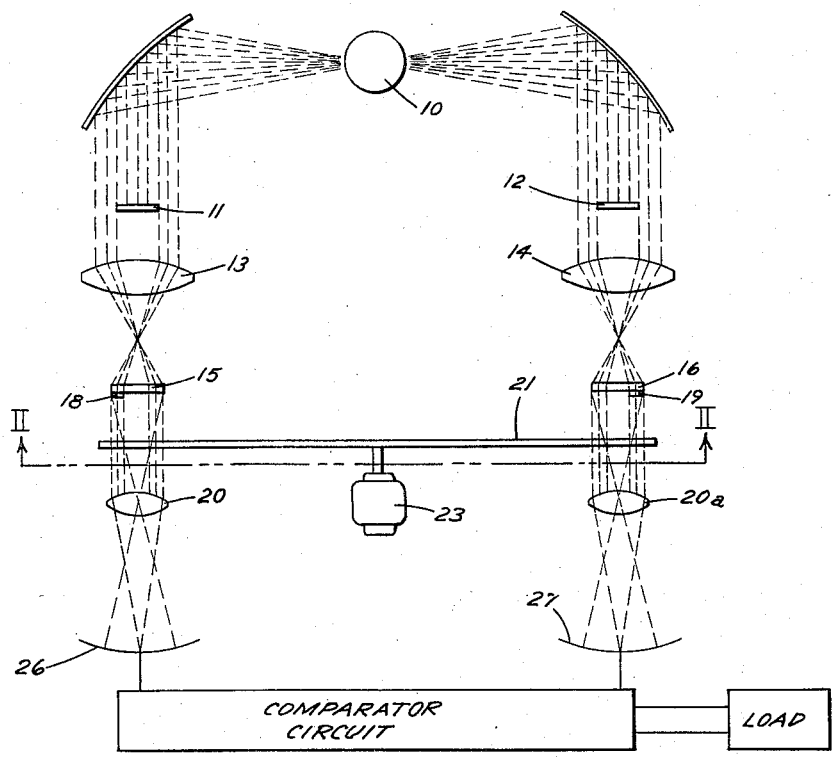
Fig. 1
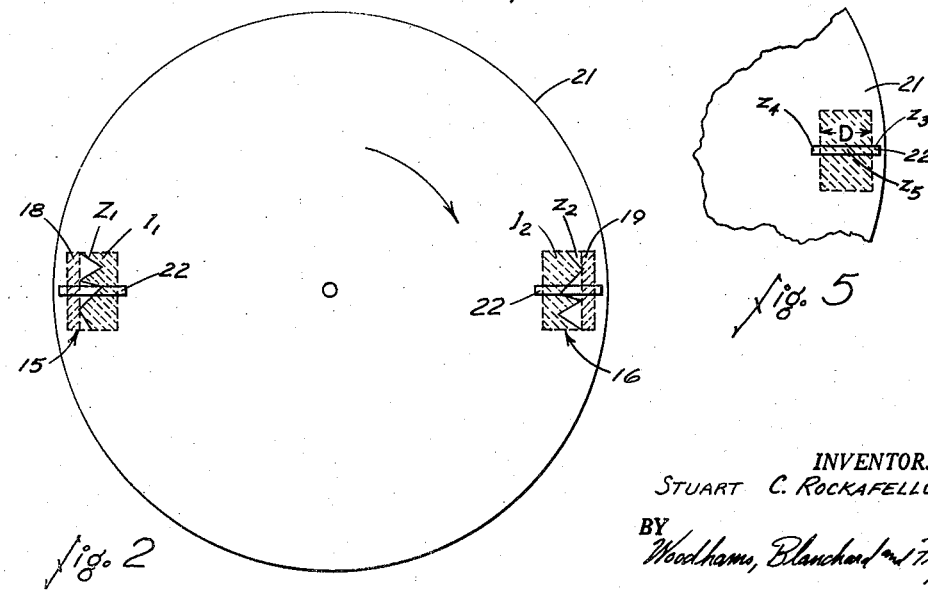
Fig. 2
Fig. 5
INVENTOR.
STUART C. ROCKAFELLOW
BY
Woodhams, Blanchard and Flynn
ATTORNEYS Aug. 18, 1959    S. C. ROCKAFELLOW    2,899,857
METHOD FOR COMPARING THE CONTOUR OF AN ARTICLE WITH A STANDARD
Filed Oct. 3, 1956    2 Sheets-Sheet 2

INVENTOR.
STUART C. ROCKAFELLOW
BY
ATTORNEYS

# United States Patent Office 2,899,857
Patented Aug. 18, 1959

2,899,857

METHOD FOR COMPARING THE CONTOUR OF AN ARTICLE WITH A STANDARD

Stuart C. Rockafellow, Plymouth, Mich., assignor to Robotron Corporation, Detroit Mich., a corporation of Michigan Application October 3, 1956, Serial No. 613,724

2 Claims. (Cl. 88—14)

This invention relates to a high speed process for inspecting the contour of a shaped article and, more particularly, relates to a process for comparing the contour of a test article with the contour of a standard, at a high rate of speed, wherein both the test article and the standard are scanned and light beams which are transmitted around the contours of the test article and the standard are fed to photoelectric cells, which photocells then energize further electrical circuitry for indicating whether the test article and the standard are identical. This application is a continuation-in-part of my copending application, Serial No. 514,337, filed June 9, 1955, and entitled "Inspection Device."

In my above referred to co-pending application, there is disclosed a device for comparing a test article with a standard, using overlapping scanning disks and photoelectric cells, which receive light reflected from said test article and said standard through said disks, and wherein any difference between the standard and the test article causes an unbalance in an electrical circuit to actuate a suitable alarm or other desired device.

While the structure disclosed in my said co-pending application is entirely satisfactory for its intended purpose, it has been found that it is relatively slow in operation because of the very detailed inspection of the article, which it performs as the result of the type of scanning operation utilized therein. With many types of manufacturing operations, it is not necessary to employ such a detailed and exhaustive scanning of the article. Instead, a check for dimensional accuracy and/or contour conformity to a standard may be enough. Further, in certain types of manufacturing operations, it is necessary to inspect the manufactured articles at a very high rate of speed. Thus, it is apparent that an inspection device employing the same broad principles as are disclosed in my aforementioned application, but using a simpler and more rapid scanning operation, is desirable.

It has been suggested to inspect articles by projecting a shadow thereof onto a screen, which is suitably masked so that an inspector can view the screen to see if the shadow falls within the limits of the standard as defined by the masking. This type of inspection is satisfactory for some purposes, but it is quite time consuming and, therefore, is inappropriate for high speed manufacturing operations, and it is expensive for any type of operation as the result of the labor costs involved.

Accordingly, it is an object of this invention to provide a high speed scanning process for inspecting the contour of a shaped article and comparing same with a standard.

It is a further object of this invention to provide a process, as aforesaid, in which the scanning operation is performed by scanning the shadow of the shaped test article and comparing same with a corresponding image of the standard.

It is a further object of this invention to provide a process, as aforesaid, utilizing a simple and rapid scanning operation performable by simple and reliable apparatus.

It is a further object of this invention to provide a process, as aforesaid, in which the scanning operation is sufficiently sensitive to make an effective inspection of the contour or profile of a shaped article at an extremely high rate of speed.

It is a further object of this invention to provide a process, as aforesaid, in which any discrepancy between the test article and the standard will be reflected in the creation of an unbalance in an electrical circuit, which may be utilized to cause actuation of a suitably responsive device.

It is a further object of this invention to provide a process, as aforesaid in which any discrepancy between the test article and the standard will be reflected in the output of an electrical circuit, which may be utilized to cause actuation of a suitably responsive device.

Other objects and advantages of this invention will become apparent to persons acquainted with equipment of this type upon reading the following disclosure and inspecting the accompanying drawings.

In the drawings:

Figure 1 is a schematic diagram illustrating the operating principle of this invention.

Figure 2 is a front view of the scanning disk, showing the image of the article and the standard as they are scanned by movement of the disk.

Figure 5 shows a scanning slot larger than the article scanned.

*General description*

Figure 4:
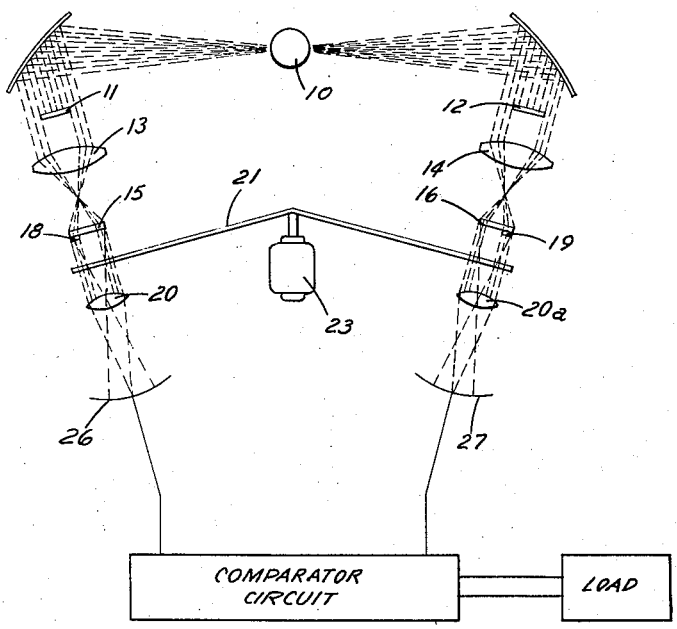
Figure 4 is a schematic diagram illustrating a modification of the operating principle of the invention.

As used in this specification and the claims appended hereto, the term "standard" means a complete, correctly constructed article or some image thereof, such as a photograph or negative, which is suitable for use in this inspection process and against which the article being inspected may be compared, both as to shape and/or selected dimensions. The term "test article" means an article whose shape, contour, profile, dimensions or other determinable characteristic is being checked by the method and/or apparatus of the invention. The term "longitudinally," unless the context clearly indicates otherwise, refers to a direction along the axis of a light path. The term "transversely" indicates a direction perpendicular to said axis.

In the practice of this invention, the test article is placed between a light source and a screen, and a shadow of the test article is projected upon the screen. A corresponding image of the standard, which may be a projected shadow, a photograph or a photo-negative, is also placed on a screen. The images on the screens are both so masked that only a relatively small portion of the light surrounding the respective images will be transmitted past the images. This transmitted light will provide light zones respectively surrounding portions, or the entirety, of the contours of the test article and of the standard as same appear on the screens. The transmitted light around the respective images then passes to a pair of photoelectric cells, which are connected to a suitable comparator circuit, whereby any departure in the relative outputs of said photoelectric cells from a predetermined relationship, in response to a variation in the light transmitted to said photoelectric cells, will actuate an alarm or other desired, responsive device.

*Detailed description*

A light source 10 illuminates both the test article 11 and the standard 12. The light beams transmitted around the peripheries of the test article and the standard are then transmitted through lens systems 13 and 14 to a pair of screens 15 and 16, which, for convenience, are herein assumed to be transparent plates. The images $I_1$ and $I_2$ (Figure 2) projected onto the screens 15 and 16 will be of shadows of all, or selected portions, of the contours of the test article and of the standard, respectively.

A mask 18 is positioned in any suitable fashion, shown in Figure 1 to be secured to the screen 15, so that it blocks out as much as possible, but not all, of the light transmitted around the periphery of the shadow image $I_1$. A similar mask 19 is secured to the screen 16 for masking a portion of the light transmitted around the shadow image $I_2$. The masks 18 and 19 may be opaque plates and have configurations which are similarly shaped, although not necessarily identical in size. The masks are positioned with respect to the portions of the contours of the article and the standard being compared to provide zones $Z_1$ and $Z_2$ of transmitted light therebetween. Where irregularities in the contour of the article being inspected are relatively small, the mask 18 need not have an edge similar in contour to the edge of the article, but may, as shown in Figure 2, be straight. However, where the irregularities are of a relatively deep nature, then it is better for the masks 18 and 19 to be of the shape indicated at 36 and 37 in Figure 3, have a contour of shape which is a mirror image of the contour of the article and the standard, and be placed closely adjacent thereto. The objective is to reduce the normal amount of light passing between the mask 18 and the test article, and between the mask 19 and the standard, to as low a value as possible in order that even small variations in said test article will effect a readily discernible change in the total amount of light passing through the zone $Z_1$ with respect to the corresponding total amount of light passing through the zone $Z_2$.

A rotatable disk 21 is positioned in longitudinal register with the screens 15 and 16. The disk 21 has an even number of slots 22, herein shown to be two slots, symmetrically arranged about the axis of rotation thereof. The disk 21 is positioned, and the slots 22 are of such radial dimension, that the slots longitudinally overlie the screens 15 and 16 to transmit light from the zones $Z_1$ and $Z_2$. Particularly, these slots must be of sufficient radial length to overlap the entire contour, or a selected portion thereof, in the direction of a radius of the articles being compared. Thus, the scanning here requires only a single pass by a slot across a test article and the testing will proceed very rapidly. Suitable means, such as a motor 23, is provided to rotate the disk 21 at a high rate of speed, such as a speed sufficient to give said slots 22 a lineal motion of, for example, from 1 to 10 feet per second where the slots are approximately .01 to .1 inch wide in the direction of travel.

A pair of photoelectric cells 26 and 27 are positioned with their cathodes in longitudinal alignment with the screens 15 and 16 on the opposite side of the disk 21 therefrom. Lenses 20 and 20a are positioned to focus the light rays passing through the slots of the disk onto the cathodes of the photoelectric cells. The outputs of the photoelectric cells 26 and 27 are connected to a suitable comparator circuit, such as that described in my aforementioned co-pending application. The comparator circuit is connected to a suitable load, which may be an alarm device or other desired apparatus, and the load will be energized if there is an unbalance in the inputs to said comparator circuit.

Operation

While the operation of this circuit has been substantially indicated throughout the description set forth hereinabove, it will be briefly summarized for the purpose of completeness. The light source 10 illuminates the test article 11 and the standard 12 and projects profile, or shadow, images thereof through the lenses 13 and 14, respectively, onto the screens 15 and 16. These images appear as shadows on the screens. The images will be surrounded by light, which is transmitted through the screens 15 and 16. The masks 18 and 19 will block out a predetermined portion of this transmitted light so that only relatively small zones $Z_1$ and $Z_2$ thereof are transmitted to the disk 21. It will be noted that when a rotatable disk is employed as the scanning means, the image of the standard must be inverted with respect to the image of the test article in order that corresponding portions of the transmitted light zones $Z_1$ and $Z_2$ are scanned at the same time. Rotation of the disk 21 will cause the slots 22 to sweep transversely across the light zones $Z_1$ and $Z_2$. The light from the screens 15 and 16 will pass to the disk 21 and that which passes through the slots 22 will impinge upon the cathodes of the photoelectric cells, which will cause a current flow to the comparator circuit. So long as the amount of light transmitted through each of the slots 22 to the photoelectric cells 26 and 27 is substantially identical, the comparator circuit will remain balanced and the load will not be actuated. This condition exists when the contour and/or size of the test article conforms closely to the contour of the standard. However, if the contour or size of the test article does not conform to the corresponding contour or dimension of the standard, an unbalance will be created in the inputs to the comparator circuit and the load will be energized, as desired, in response to this fact.

There being no provision made for progressive scanning across a surface of the test article and the standard, it will be apparent that the device of the present invention operates by inspecting the total amount of light passing the test and the standard in a single sweep of the slots 22 and that, accordingly, the ability of the device embodied in the present invention to process or to inspect articles at a high rate of speed is very great. It will be recognized that articles may be placed with respect to the slots 22 in a variety of positions including a position where light is permitted to pass on both sides of an article, as illustrated in Figure 5, so that the amount of light appearing at zones $Z_3$ and $Z_4$ will indicate the dimension designated at D.

Further, in the arrangement appearing in Figure 5, since the photocell on which impinges the light passing through the zones $Z_3$ and $Z_4$ will respond solely to the total amount of light passing through said zones, it will be apparent that an accurate measurement of the dimension "D" will be obtained if the part to be inspected is placed anywhere between the ends of the slot 22. Thus, it is not essential to place successive parts being inspected in precisely the same positions with respect to each other, nor even in exactly the same position with respect to the slot 22 as is occupied by the standard, excepting only that for reasons stated above it is desirable to keep the size of the zones $Z_3$ and $Z_4$ as small as possible with respect to the size of the zone $Z_5$, namely, the portion of the slot through which passage of light is blocked by the article being inspected. This further adapts the method and apparatus of the invention to practical industrial usage and further facilitates its operation at high rates of speed.

Modifications

Figure 3:
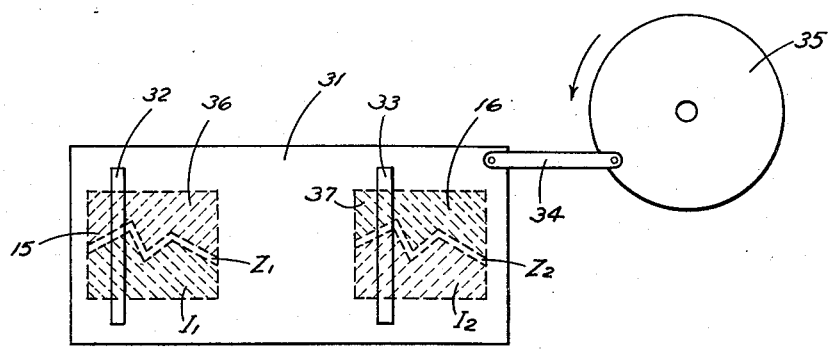
Figure 3 is a front view of a modified type of scanning device and also shows a modified masking arrangement.

It is apparent that the light zones $Z_1$ and $Z_2$ between the masks and the images on the respective screens can be scanned by a variety of different apparatuses. Thus, as shown in Figure 3, a plate 31 having a pair of slots 32 and 33 therein is mounted for transverse reciprocation. The slots 32 and 33 are longitudinally aligned with the light zones $Z_1$ and $Z_2$. Any suitable means, such as the connecting rod 34 connecting the plate 31 to an eccentric 35, may be employed to reciprocate the plate 31.

It is apparent that the rate of reciprocation would have to be of a very high order, such as a speed sufficient that the slots 32 and 33 will pass the respective screens 15 and 16 at a lineal rate of, for example, approximately 1 to 10 feet per second. It will also be apparent that the amplitude of reciprocation of said slots should be enough greater than the length of said screens, in the direction of such reciprocation, that the slots will pass said screens at a relatively high rate of speed. Thus, if said reciprocation follows the laws of simple harmonic motion, as it would in the case of the device schematically illustrated in Figure 3, only about the middle 90° of the full stroke of 180° should occur in front of said screens. On the other hand, this general type of device has some advantage over the type indicated in Figure 2 in that neither the standard nor the test article needs to be inverted, but both can occupy similarly oriented positions. This is advantageous in some instances, particularly where some visual inspection may be used to supplement the mechanical inspection.

The image $I_2$ of the standard 12 on the screen 16 can be provided by positioning a photo-negative or other corresponding image in proper location on the screen 16. Accordingly, the invention is not limited to the projection of the shadow of the standard.

While the invention has been described primarily with reference to the use of transparent screens, it is apparent that the invention can be used with conventional, reflecting-type screens wherein shadow images or the shadow image of the test article and the photo-negative of the standard could be placed side-by-side thereon.

Where the inspection method requires high sensitivity to extremely small differences in light intensity, it may be advisable to use photo-multiplier tubes in place of the photoelectric cells, in order to provide a device which is responsive to such small differences in light intensity. This is also of value where the image of the test article and the image or photo-negative of the standard are projected in relatively small size on the screen, e.g., the size of a 35 mm. transparency. Under the most favorable circumstances with a screen of such size, the light differences, even for fairly major differences in the contours of the test article and the standard, are quite small. The use of photo-multiplier tubes is also desirable since it permits a more rapid scanning, without any loss in effectiveness or sensitivity.

While throughout this description it has been assumed that the outputs of the photocells 26 and 27 would be equal to each other where the test article is identical to the standard, it will be recognized that variations in the optical systems, the masks, the distance of the screens from the photocells, and other similar structural characteristics may result in the normal outputs of the photocells being at some predeterminable ratio other than equality with respect to each other. In such cases, suitable account will necessarily be taken thereof in the comparator circuit and the signal-indicating lack of similarity between the test article and the standard will still be a disturbance of the predetermined ratio.

By the same token, it will be recognized that normally the screens 15 and 16 are co-planar with respect to each other. However, other relationships are possible, without departing from the scope of the invention, and will be self-evident to those acquainted with apparatus of this general type. For example, as schematically illustrated in Figure 4, where it may be desirable for convenience in handling test articles, the test article and the standard may be separated somewhat from each other and the center lines of the respective light beams emanating from the test article and the standard may be convergent.

Figure 4 also illustrates the fact that the disk 21, while preferably lying in a single plane, may be otherwise constructed to fit special requirements, without departing from the scope of the invention.

Although the above mentioned drawings and description refer to particular, preferred embodiments of my invention, it is not my intention, implied or otherwise, to eliminate other variations or modifications, which do not depart from the scope of the invention, as defined in the appended claims.

I claim:

1. A process for inspecting the contour of a test article and comparing the same with a standard, the steps including: projecting a shadow of said article upon a first screen and transmitting radiation past said shadow around the portion of the contour thereof to be inspected; placing an image of said standard corresponding to a shadow thereof upon a second screen, said image being of predetermined size with respect to said shadow, and transmitting radiation past said image around the portion of the contour thereof corresponding to the portion of the contour of the shadow to be inspected; masking portions of said transmitted radiation to provide zones of transmitted radiation surrounding said portions of the contours of said image and said shadow; simultaneously moving an aperture transversely across each of said zones at the same rates of speed, said apertures transversely moving across corresponding regions of said zones to simultaneously and longitudinally transmit radiation from successive regions of said zones through said apertures; measuring the intensity of the radiation transmitted from said successive regions; and actuating a load means if the radiation transmitted from said successive regions varies from a predetermined ratio.

2. A process for inspecting the contour of a test article and comparing the same with a standard, the steps including: projecting a shadow of said article upon a screen and transmitting light past said shadow around the portion of the contour thereof to be inspected; projecting a shadow of said standard in the same optical plane as the shadow of said article, said shadow of said standard being the same size as said shadow of said article, and transmitting light past said shadow of said standard around the portion of the contour thereof corresponding to the portion of the contour of the shadow of said article to be inspected; masking portions of said transmitted light to provide zones of transmitted light surrounding said portions of the contour of said shadows; simultaneously moving an aperture transversely across each of said zones at the same rates of speed, said apertures transversely moving across corresponding regions of said zones to simultaneously and longitudinally transmit light from successive regions of said zones; measuring the intensity of the light transmitted from said successive regions; and actuating a load means if the light transmitted from said successive regions is unbalanced.

References Cited in the file of this patent

UNITED STATES PATENTS

| | | |
|---|---|---|
| 2,026,330 | Tauschek | Dec. 31, 1935 |
| 2,145,591 | Fitz Gerald | Jan. 31, 1939 |
| 2,679,636 | Hillyer | May 25, 1954 |

FOREIGN PATENTS

| | | |
|---|---|---|
| 742,113 | Germany | Nov. 22, 1943 |
| 1,024,076 | France | Jan. 7, 1953 |